B. A. PETERSON.
BOBBIN HANDLING APPARATUS.
APPLICATION FILED MAY 10, 1915.
1,257,946.
Patented Feb. 26, 1918.
5 SHEETS—SHEET 1.
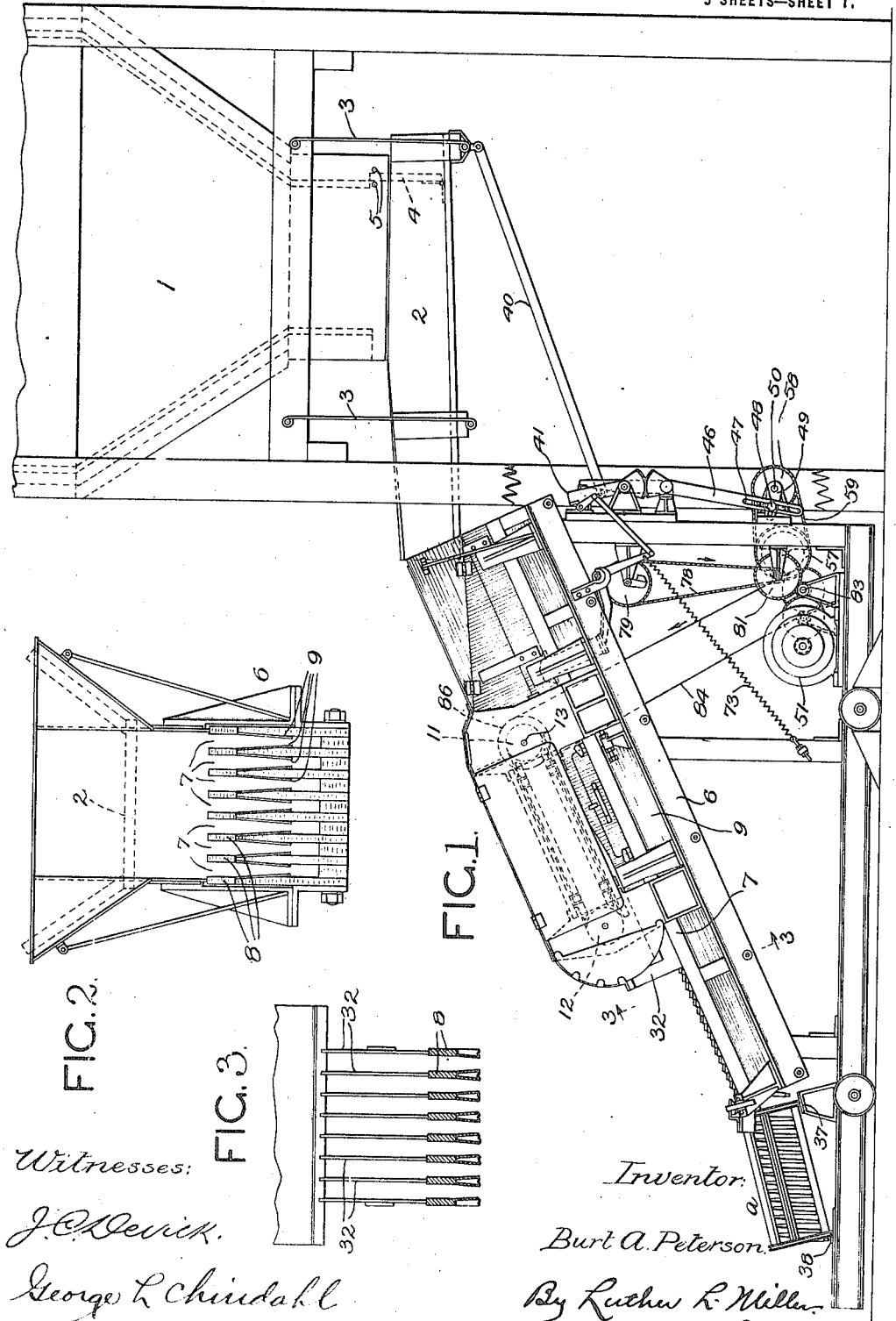

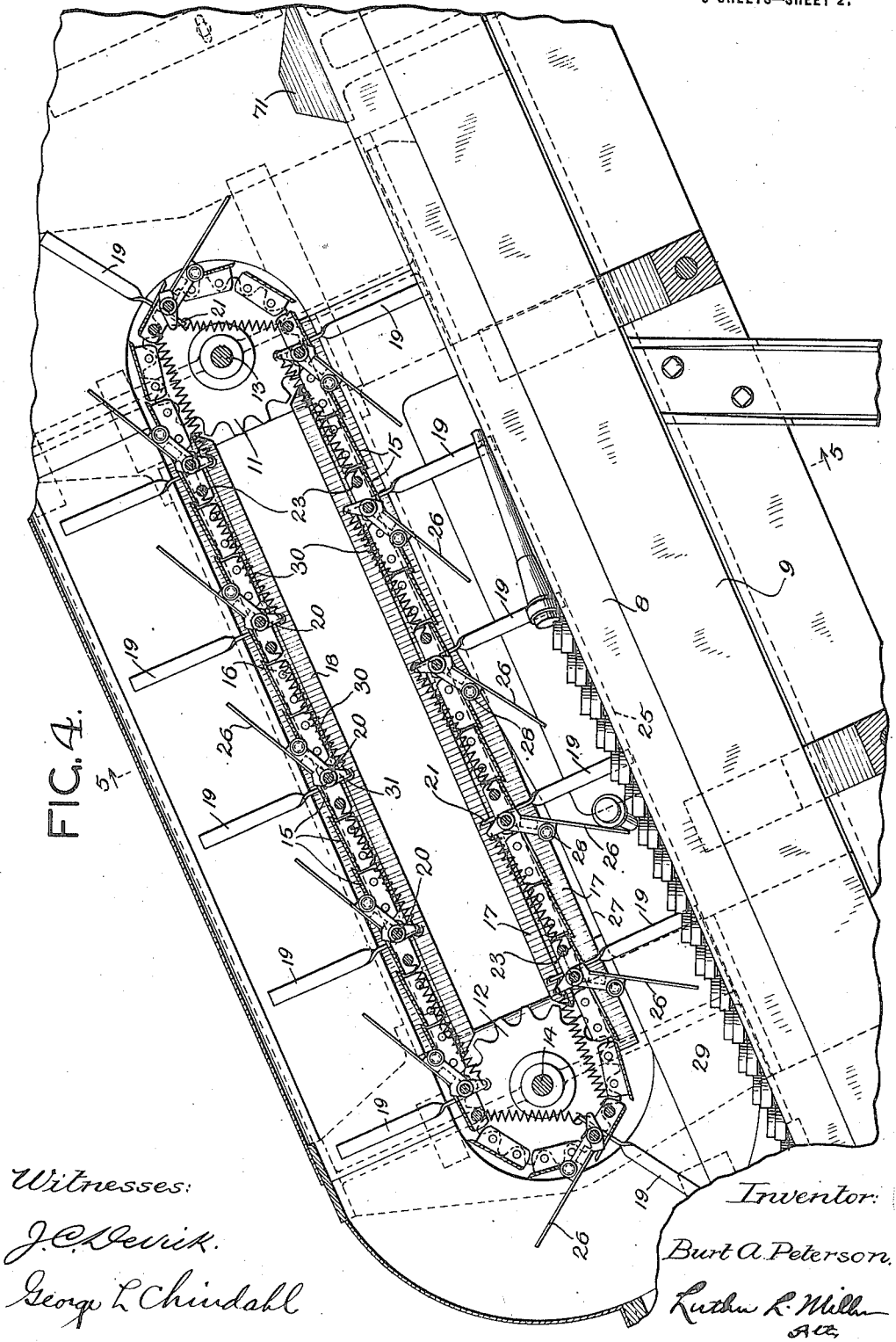

B. A. PETERSON.
BOBBIN HANDLING APPARATUS.
APPLICATION FILED MAY 10, 1915.

1,257,946.

Patented Feb. 26, 1918.
5 SHEETS—SHEET 3.

Witnesses:
J. C. Devrik.
George L. Chindahl

Inventor:
Burt A. Peterson
By Luther L. Miller
Atty.

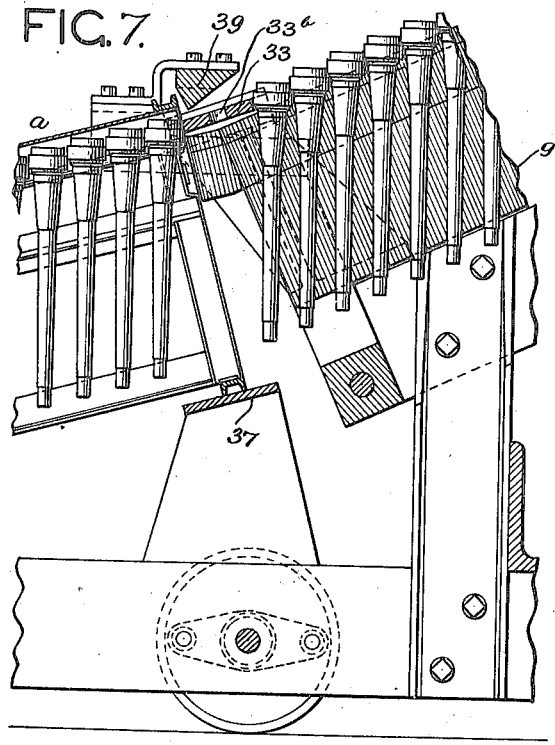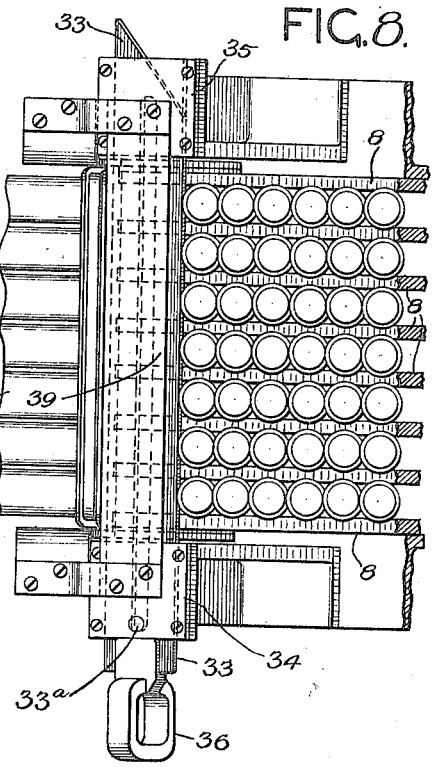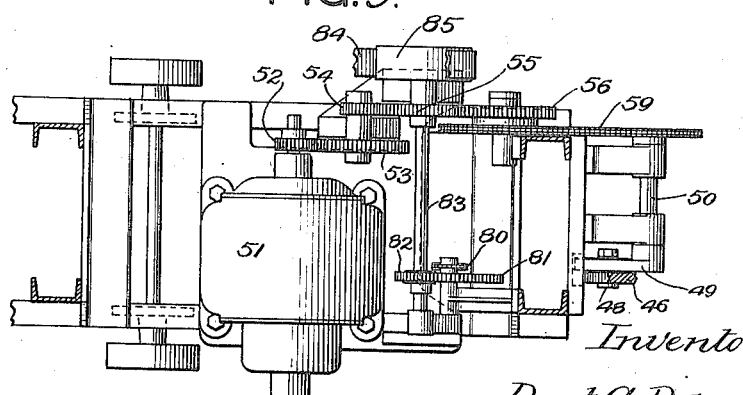

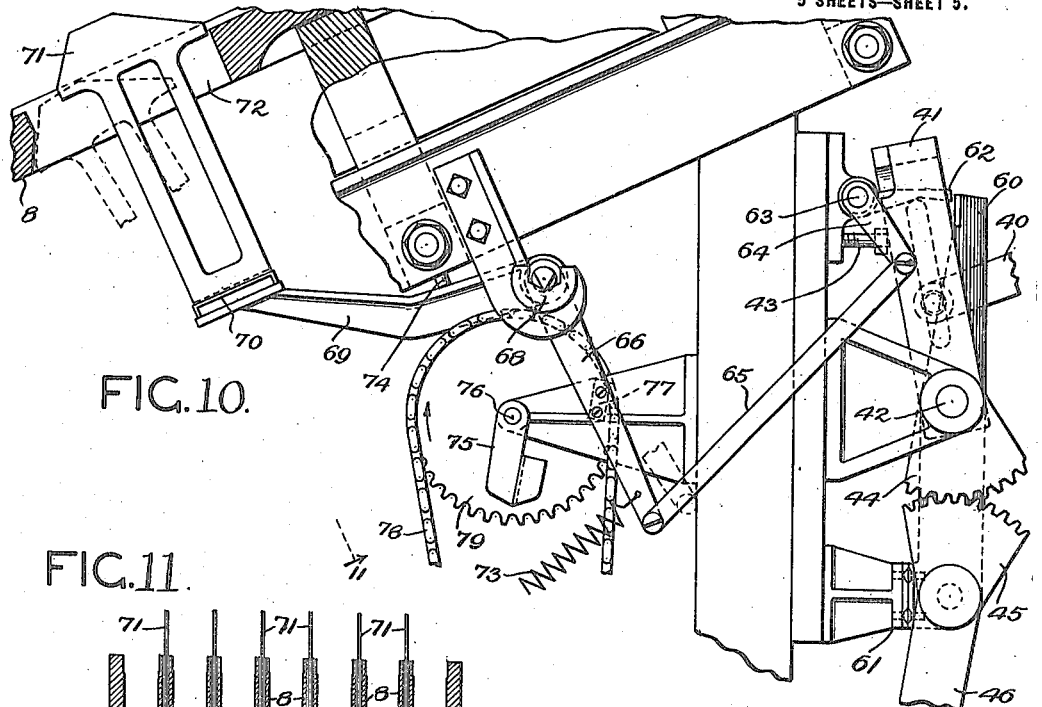
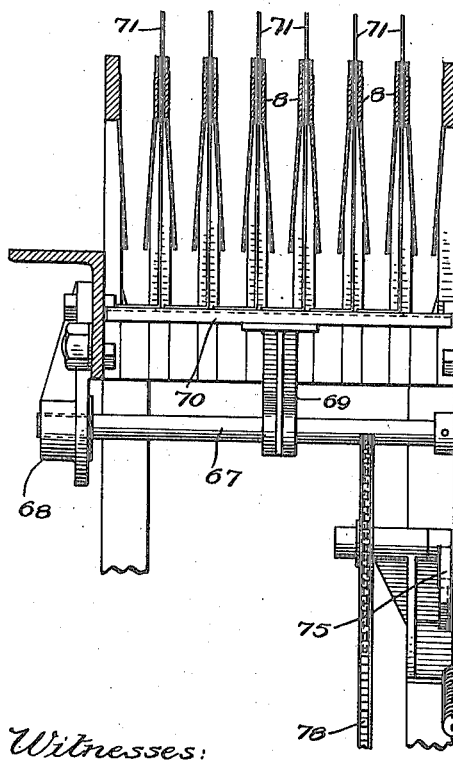
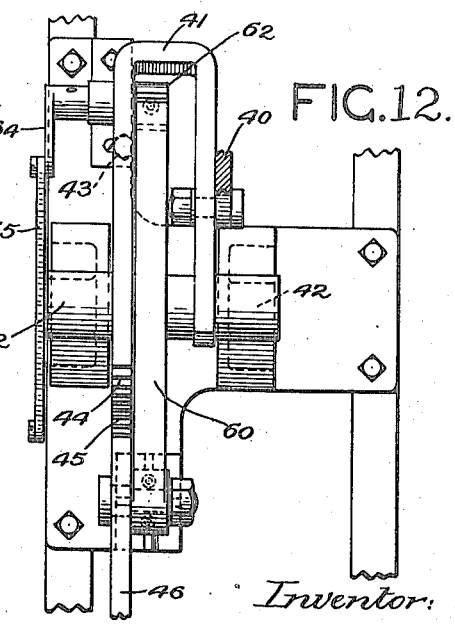

UNITED STATES PATENT OFFICE.

BURT A. PETERSON, OF ROCKFORD, ILLINOIS, ASSIGNOR TO HOWARD D. COLMAN, LUTHER L. MILLER, AND HARRY A. SEVERSON, OF ROCKFORD, ILLINOIS, COPARTNERS DOING BUSINESS AS BARBER-COLMAN COMPANY.

BOBBIN-HANDLING APPARATUS.

1,257,946.      Specification of Letters Patent.      Patented Feb. 26, 1918.

Application filed May 10, 1915. Serial No. 27,037.

*To all whom it may concern:*

Be it known that I, BURT A. PETERSON, a citizen of the United States, residing at Rockford, in the county of Winnebago and State of Illinois, have invented certain new and useful Improvements in Bobbin-Handling Apparatus.

This invention relates to apparatus for placing bobbins in a predetermined uniform arrangement, in order, for example, that the bobbins may be expeditiously placed in the magazines of spinning frame doffers. In some aspects, the object of the invention is to improve the apparatus shown in Patent No. 1,108,097, issued August 18, 1914, but it will be understood that certain features of the invention are not limited to apparatus of the type disclosed in said patent.

Among the salient objects of the invention are to provide means for automatically controlling the supply of bobbins in accordance with the needs of the apparatus; to provide means for preventing said controlling means from becoming inoperative through clogging with bobbins; to provide means above the slotted bobbin-arranging structure to prevent bobbins from becoming caught in the mechanism; to make the alining fingers yieldable; to provide means for closing the lower end of the bobbin-arranging structure against the escape of bobbins; and to provide means for guiding the butts of crowded bobbins into the magazine.

Figure 5:
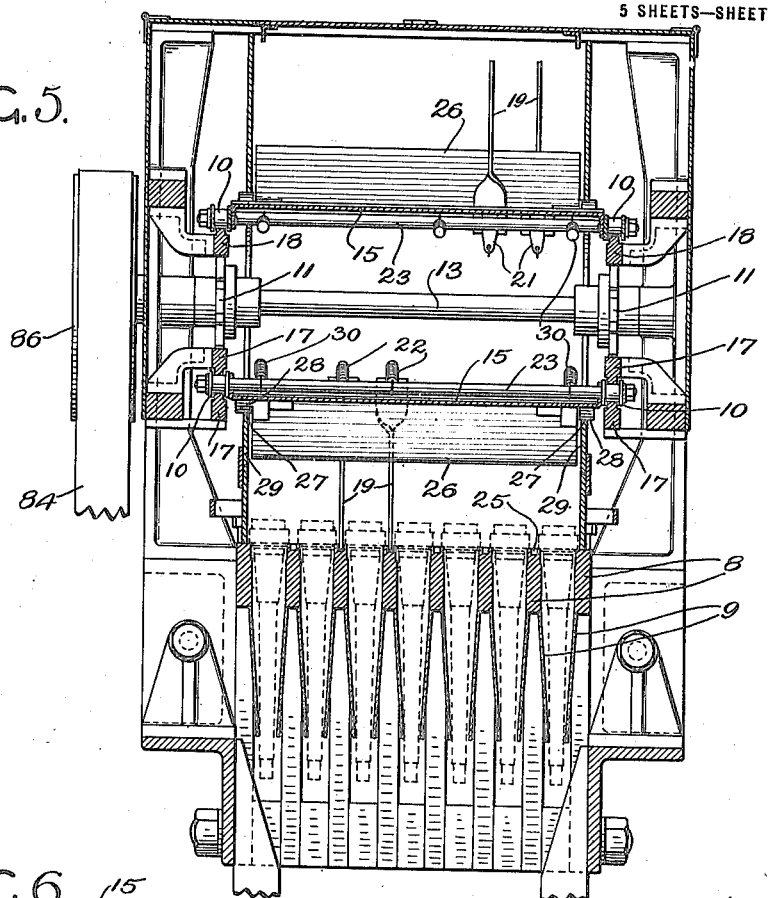
Figure 6:
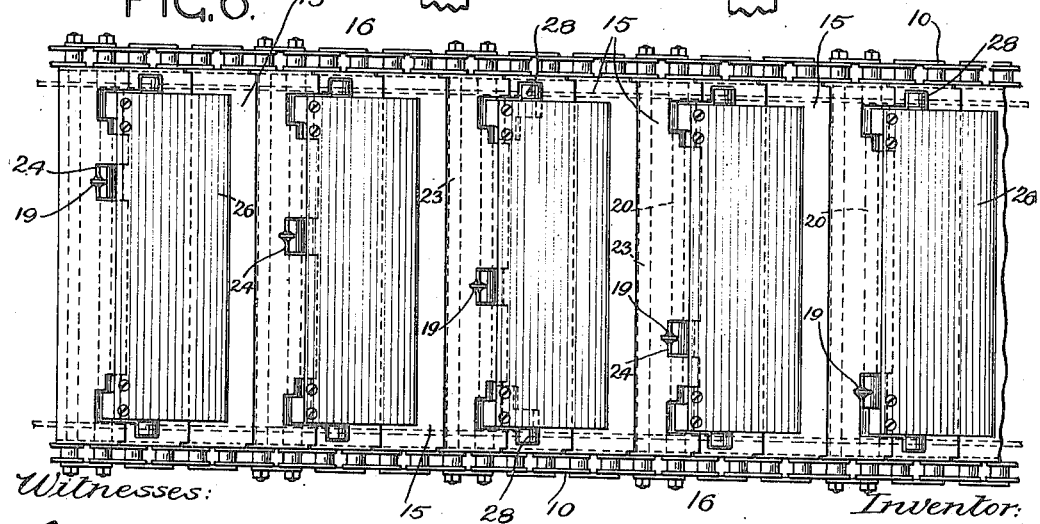

In the accompanying drawings, Figure 1 is a side elevation of an apparatus embodying the features of my invention. Fig. 2 is a view of the upper end of the slotted bobbin-arranging structure, the trough that discharges the bobbins onto said structure being indicated in dotted lines. Fig. 3 is a fragmental view taken in the plane of dotted lines 3—3 of Fig. 1. Fig. 4 is a fragmental sectional view of the slotted bobbin-arranging structure and the alining devices coöperating therewith. Fig. 5 is a sectional view upon an enlarged scale taken in the plane of dotted line 5—5 of Fig. 4. Fig. 6 is a fragmental top plan view of an endless apron carrying bobbin-alining devices. Fig. 7 is a view taken in the plane of dotted line 7 of Fig. 8. Fig. 8 is a fragmental top plan view of the lower end of the slotted bobbin-arranging structure showing a magazine in operative relation thereto. Fig. 9 is a fragmental top plan view of the driving mechanism. Fig. 10 is a fragmental view illustrating the sensitively-controlled means for shaking the above mentioned trough. Fig. 11 is a sectional view taken approximately in the plane of dotted line 11 of Fig. 10. Fig. 12 is a view looking from the right-hand side of Fig. 10.

While the embodiment shown in the drawings is particularly intended to handle weft or filling bobbins, it will be understood that the invention may be embodied in apparatus for operating upon other kinds of bobbins.

The present embodiment of the invention is adapted to place the bobbins in the magazine of a spinning-frame doffer, but it will be evident that certain features of the invention are applicable to apparatus for filling other kinds of bobbin magazines. The form of doffer magazine *a* herein shown is substantially similar to that disclosed in Patent No. 1,122,417, dated Dec. 29, 1914, and is adapted to contain seven rows of bobbins, the tips of all the bobbins extending in the same direction.

Bobbins are supplied to the apparatus from any suitable source, as, for example, an elevated bin or hopper 1. A trough 2 is suspended by means of the links 3 below the open lower end of the hopper 1, the bottom of the trough 2 being slightly inclined, as shown. The upper end of the trough 2 is closed by means of a gate 4 which is hinged at its lower end to the trough, the upper end of the gate lying loosely between two rods 5 carried by the hopper 1. The trough 2 is arranged to be reciprocated or shaken to discharge bobbins from the lower end of the trough to the apparatus for arranging the bobbins with their tips extending in the same direction and for arranging the bobbins in rows ready to be inserted into a magazine *a*. The means for shaking the trough 2 will be described hereinafter.

The apparatus for arranging the bobbins for introduction into the magazine *a* comprises a downwardly inclined structure 6 having longitudinal downwardly-extending slots 7 therein (see Fig. 2). These slots are defined by spaced rails 8 and plates 9. The slots 7 are of greater width than the diameter of the tips of the bobbins, but of less width than the greatest diameter of the butts of the bobbins. The bobbins therefore may hang in said slots with their butts supported upon the edges of the rails 8, as shown in Figs. 5 and 8. The bobbins shaken from the trough 2 drop upon the slotted structure 6 and commence rolling or sliding down said structure; in so doing the majority of the bobbins become alined with the slots and swing downwardly into the slots. To assist in alining the bobbins with the slots there is provided means comprising two endless sprocket chains 10 (Figs. 5 and 6) carried by sprocket wheels 11 and 12 (Fig. 4), the wheels 11 being fixed upon a shaft 13, and the sprocket wheels 12 being carried upon a shaft 14. Opposite links of the chains 10 are rigidly connected together by means of plates 15, which plates overlap slightly, as indicated in Fig. 4. The chains 10 and plates 15 thus constitute an endless apron 16. The lower run of the apron is guided to move parallel with the inclined structure 6 by means of two pairs of guide bars 17 (Fig. 5) fixed in the framework of the machine, the chains 10 running between said bars. The upper run of the apron is prevented from sagging by means of two guide bars 18 which support the chains between the sprocket wheels 11 and 12. It will be seen that the plates 15 constitute a cover for the adjacent portion of the slotted structure and prevent bobbins from being caught in the chains and sprocket wheels.

Moving with the apron 16 is a series of fingers 19 for raking the bobbins and thus to assist in alining them with the slots. Each finger is pivoted upon a rod 20 carried by the chains 10. Rigid with each finger 19 is a projection 21 to which is connected one end of a spring 22, the other end of the spring being attached to a rod 23 carried by the chains 10. The normal position of the finger under the action of the spring 22 is determined by contact of the finger with the edge of an opening 24 (Fig. 6) in the adjacent plate 15. While the fingers 19 may be disposed in any suitable order, they are preferably arranged in echelon, as best shown in Fig. 6. As the fingers 19 travel upwardly they come into contact with any bobbins which may be rolling or sliding down the inclined structure 6 and thereby turn such bobbins into alinement with the slots, whereupon the bobbins swing downwardly into the desired position. During the working portion of the travel of the fingers 19 they are held against lateral displacement by reason of the fact that the ends of the fingers travel through grooves 25 (Figs. 4 and 5) in the upper edges of the rails 8. As shown in Fig. 5, the fingers 19 travel in the spaces between the rows of properly-positioned bobbins.

Means is provided for preventing the bobbins from rolling or sliding down the inclined structure so far that the fingers 19 are unable to aline them. In the present embodiment, the means referred to consists of a plurality of guard plates 26 each pivotally supported upon one of the rods 20. As the guard plates 26 move upwardly, they arrest any unalined bobbins which otherwise would roll or slide too far down the inclined structure. If some of the bobbins in the slots 7 should become crowded so close together that the butts of some of the bobbins are above the proper plane, the plates 26 force the bobbins up along the slots until the bobbins drop into proper position. In order that the guard plates 26 shall not interfere with the operation of alining the bobbins, means is provided to swing the plates upwardly after they have passed the point where they are needed, which means consists of two guide surfaces 27 (Figs. 4 and 5) along which rollers 28 on the guard plates are arranged to travel. Said guide surfaces are so formed as to cause the plates to swing upwardly and rearwardly after said plates have traveled upwardly some distance along the slotted structure 6. In the present embodiment, the guide surfaces 27 are the edges of two plates 29 which form part of a housing for the apron 16. The plates 29 are continued upwardly around the ends of the apron and along the sides of the upper run of the apron. The rollers 28 run in contact with the edges of the said plates as shown in Fig. 4. Each guard plate 26 is yieldingly held in operative position by means of two springs 30 (Figs. 4 and 5), each of said springs being connected at one end to a lug 31 (Fig. 4) rigid with the plate and at the other end to one of the rods 23. Adjacent to the lower end of the path of movement of the fingers 19 and guard-plates 26 is a series of vertical plates 32 (Figs. 1 and 3), each located in the vertical plane of one of the rails 8 and serving to stop any bobbin which might descend thus far without having entered one of the slots 7. Any such bobbin would be carried up by the plates 26 (Fig. 4) until it entered one of the slots. The two outer plates 32 are in the same vertical plane as the plates 29 and are connected to the latter.

The lower end of the slotted structure 6 is closed against the discharge of bobbins by means of a gate 33 (Figs. 7 and 8), said gate consisting of an elongated plate which is slidably mounted in guides 34 and 35 at opposite sides of the slotted structure. The gate 33 is provided at one end with a handle 36. The other end of the gate is made wedging so as to be adapted to crowd aside the bobbins when the gate is returned to its operative position. A pin 33ª extending through a slot 33ᵇ in the gate limits the movement of the gate.

During the operation of loading a magazine *a*, the magazine is supported in inclined position with its open end registering with the lower end of the slotted structure 6. The open end of the magazine rests upon a support 37, the lower end of the magazine being held in place by means of a stop bar 38. 39 (Fig. 7) is a stationary bar extending transversely of the slotted structure 6 in front of the upper end of the magazine *a*, one face of said bar being beveled to serve as a guide in directing into the magazine any bobbins which may have been crowded so close together that their butts are above the normal or proper position.

When a magazine is to be filled, the operator places the open end of the magazine upon the support 37, the lower end of the magazine resting against the stop bar 38. The gate 33 is then withdrawn, whereupon bobbins slide down the inclined structure 6 and into the magazine until the latter is filled. The operator then returns the gate 33 to its normal position to prevent the escape of bobbins when the magazine is withdrawn.

The means for shaking the trough 2 and for regulating the discharge of bobbins from the trough will now be described. A link 40 (Fig. 1) is pivotally connected at one end to the trough 2 and at its other end to an arm 41 (Figs. 10 and 12). The arm 41 is mounted to swing on the center 42. The weight of the trough 2 and its contents tends to hold the arm 41 against an adjustable stop 43. Rigid with the arm 41 is a gear segment 44 that meshes with a similar segment 45. The segment 45 is rigid with a link 46, the lower end of which has a slot 47 therein (see Fig. 1). A crank pin 48 carried by an arm 49 operates in the slot 47. The arm 49 is fixed to a shaft 50 (Fig. 9). The shaft 50 is driven by an electric motor 51 through the gearings 52, 53, 54, 55 and 56, the sprocket wheels 57 and 58 (Fig. 1) and the sprocket chain 59. The gear segment 45 is pivotally supported upon the lower end of a lever 60 (Figs. 10 and 12), which lever is pivoted upon the center 42. 61 is a stop adjacent to the lower end of the lever 60 to limit the pivotal movement of the lever in one direction. Means sensitive to the presence of bobbins on the upper portion of the slotted structure 6 is provided to lock the lever 60 against pivotal movement in the opposite direction. When the lever 60 is free to swing upon the axis 42, the weight of the trough 2 and its contents is sufficient to hold the arm 41 against the stop 43, the segment 45 rolling idly on the segment 44. When the lever 60 is not at liberty to swing, the oscillation of the segment 45 causes the segment 44 to swing and thus the trough 2 is reciprocated to shake bobbins onto the upper portion of the slotted structure 6.

The means for controlling pivotal movement of the lever 60 comprises a detent 62 (Fig. 10) which is pivoted at 63, the free end of said detent being adapted to lie in the horizontal plane of the upper end of the lever 60 and prevent movement of said lever. The detent 62 is rigidly connected to a crank arm 64 which is connected through a link 65 to an arm 66. The arm 66 is fixed to a rock-shaft 67 carried in knife-edge bearings 68. Rigid with the shaft 67 is an arm 69, to which is fixed a bar 70. To the bar 70 is fixed a plurality of upwardly extending feeler fingers 71. The upper portions of the feeler fingers extend through slots 72 formed in all of the rails 8 except the two outer rails. A spring 73 tends to turn the shaft 67 in the direction to place the upper ends of the fingers 71 above the upper surfaces of the rails 8. 74 is a stop to limit the action of the spring 73.

When there is a sufficient quantity of unalined bobbins lying upon the rails 8 at the upper end of the alining devices 16, 19 and 26, the bobbins will hold the fingers 71 depressed against the action of the spring 73 and thus hold the detent 62 above the upper end of the lever 60. The crank 49 will then cause the lever 60 to swing, the arm 41 remaining in contact with the stop 43. When the mass of unalined bobbins has been so reduced that the remaining bobbins are not able to overcome the spring 73, said spring causes the detent 62 to swing into the path of movement of the lever 60, whereupon the oscillations of the segment 45 causes the arm 41 to swing until sufficient bobbins have been shaken from the trough 2 to depress the feeler fingers 71.

It sometimes happens that bobbins will become jammed between the feeler fingers 71 and thus prevent said feeler fingers from descending, even though there be a sufficient supply of bobbins upon the slotted structure 6. To prevent the continued operation of the shaker 2 under such circumstances, I provide positive means for periodically lowering the feeler fingers 71. This means comprises a cam arm 75 fixed to a shaft 76 and arranged to revolve into contact with a block 77 fixed upon the arm 66. The cam arm 75 is revolved at a relatively low speed by means of a chain belt 78 running over a sprocket wheel 79 fixed on the shaft 76 and over a sprocket wheel 80 (Fig. 9). The sprocket wheel 80 is rigid with a spur gear wheel 81 that meshes with a pinion 82 fixed on a shaft 83. The shaft 83 carries the spur gear wheel 55. When the free end of the arm 75 is revolved into contact with the block 77, the arm 66 is moved to positively withdraw the fingers 71 from above the rails 8, thus releasing any bobbins that might have been jammed between the fingers 71.

The apron 16 is driven by means of a belt 84 (Fig. 9) running over a pulley 85 fixed on the shaft 83 and over a pulley 86 (Figs. 1 and 5) fixed to the shaft 13.

While I have described the present embodiment of the invention with considerable particularity, such description of details is not to be construed as a limitation of the invention, the scope of the invention being indicated by the appended claims.

I claim as my invention:

1. The combination of a plurality of spaced rails providing bobbin-receiving slots, a vibratory support for shaking bobbins onto said rails, means for vibrating said support, means including a plurality of fingers movable through said rails into position to bear against bobbins lying on said rails for controlling the operation of said vibrating means, and means for withdrawing said fingers from contact with the bobbins.

2. The combination of a plurality of spaced rails providing bobbin-receiving slots, means to discharge bobbins upon said rails, means including a plurality of fingers movable through said rails into position to bear against bobbins lying on said rails for controlling the operation of said discharging means, and means for withdrawing said fingers from contact with the bobbins.

3. The combination of an inclined structure having longitudinal slots to receive rows of bobbins, means for supporting a bobbin magazine with its open end adjacent to the lower end of said structure, and a slidable gate to prevent the escape of bobbins from the lower end of said structure.

4. In bobbin-handling apparatus, in combination, a slotted structure on which bobbins may move, means for discharging bobbins onto said structure, and means including a finger located between two slots of said structure and adapted to bear against bobbins lying on said structure for controlling the operation of said discharging means.

5. The combination of a plurality of spaced rails providing bobbin-receiving slots, a vibratory support for shaking bobbins onto said rails, means for vibrating said support, and means including a plurality of fingers movable through said rails into position to bear against bobbins lying on said rails for controlling the operation of said vibrating means.

6. The combination of a plurality of spaced rails providing bobbin-receiving slots, means to discharge bobbins upon said rails, and means including a plurality of fingers movable through said rails into position to bear against bobbins lying on said rails for controlling the operation of said discharging means.

7. The combination of a movable support for bobbins, means including gearing for shaking said support to discharge bobbins therefrom, means for driving the gearing, a movable support for one of the gearing elements, and means for locking said last mentioned support against movement.

8. The combination of a movable support for bobbins, means including gearing for shaking said support to discharge bobbins therefrom, means for driving the gearing, a movable support for one of the gearing elements, means for locking the last mentioned support against movement, and bobbin-controlled means for operating said locking means.

9. The combination of a movable support for bobbins, a pivoted arm connected to said support, gearing for actuating said arm, means for driving the gearing, a movable support for one of the gearing elements, and means for locking said last mentioned support against movement.

10. The combination of a movable support for bobbins, a gear segment connected to said support, a second gear segment meshing with the first gear segment, means for oscillating the second gear segment, a movable support for the second gear segment, and means for locking said segment support against movement.

11. The combination of a movable support for bobbins, a pivoted arm connected to said support, a gear segment connected to said arm, a second gear segment meshing with the first gear segment, means for oscillating the second gear segment, a movable support for the second gear segment, and means for locking said segment support against movement.

12. The combination of a movable support for bobbins, a pivoted arm connected to said support, a stop against which said arm normally rests, a lever pivoted intermediate its ends on the axis of said arm, an element supported by said lever, an element connected to said arm and engaging the first mentioned element, means to actuate the first mentioned element, and means for controlling pivotal movement of said lever.

13. The combination of a movable support for bobbins, a pivoted arm connected to said support, a stop against which said arm normally rests, a lever pivoted intermediate its ends on the axis of said arm, a gear segment pivotally supported by said lever, a gear segment connected to said arm and meshing with the other segment, means to oscillate the first mentioned segment, and means for controlling pivotal movement of said lever.

14. The combination of a movable support for bobbins, an arm connected to said support, a stop against which said arm normally rests, a lever pivoted intermediate its ends on the axis of said arm, a gear segment fixed to said arm, an intermeshing gear segment pivoted on one end of said lever, means for oscillating the second mentioned segment, and two stops coöperating to prevent movement of said lever, one of said stops being withdrawable.

15. The combination of a movable support for bobbins, an arm connected to said support, a stop against which said arm normally rests, a lever pivoted intermediate its ends on the axis of said arm, a gear segment fixed to said arm, an intermeshing gear segment pivoted on one end of said lever, means for oscillating the second mentioned segment, two stops coöperating to prevent movement of said lever, and bobbin-controlled means for withdrawing one of said stops.

16. In bobbin-handling apparatus, in combination, an inclined longitudinally slotted structure down which bobbins may slide, and an endless cover arranged to move along and above said structure, said cover comprising two endless chains, and plates extending from one chain to the other and lying substantially in the plane of movement of the chains.

17. The combination of an inclined structure having longitudinal slots to receive rows of bobbins, means for supporting a bobbin magazine with its open end adjacent to the lower end of said structure, and a guide bar extending above and adjacent to one end of the magazine for directing displaced bobbins into the magazine.

18. The combination of an inclined structure having longitudinal slots to receive rows of bobbins, withdrawable means to prevent the escape of bobbins from the lower end of said structure, means for supporting a bobbin magazine with its open end adjacent to the lower end of said structure, and means for directing displaced bobbins into the magazine.

In testimony whereof I hereunto set my hand in the presence of two witnesses.

BURT A. PETERSON.

In the presence of—
FLORENCE E. MASON,
JOHN F. OLSON.